United States Patent
Callanan et al.

(10) Patent No.: US 7,395,509 B1
(45) Date of Patent: Jul. 1, 2008

(54) TEMPORAL VISUALIZATIONS OF COLLABORATIVE EXCHANGES

(75) Inventors: Sean Callanan, Churchtown (IE); Gary Denner, Celbridge (IE); Patrick J. O'Sullivan, Ballsbridge (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/944,886

(22) Filed: Nov. 26, 2007

(51) Int. Cl.
*G06F 3/00* (2006.01)
*G06F 3/048* (2006.01)

(52) U.S. Cl. .................. 715/751; 715/750; 715/752; 715/753; 715/754; 715/755; 715/756; 715/757; 715/758; 715/759; 715/760

(58) Field of Classification Search .......... 715/750–760
See application file for complete search history.

(56) References Cited

U.S. PATENT DOCUMENTS

| | | | |
|---|---|---|---|
| 5,717,879 | A | 2/1998 | Moran et al. |
| 6,693,652 | B1 | 2/2004 | Barrus et al. |
| 6,981,223 | B2 | 12/2005 | Becker et al. |
| 7,007,226 | B1 | 2/2006 | Smith et al. |
| 2006/0085515 | A1* | 4/2006 | Kurtz et al. ............. 709/207 |
| 2006/0156255 | A1 | 7/2006 | Bedingfield |
| 2006/0167662 | A1 | 7/2006 | Yu et al. |
| 2006/0200832 | A1 | 9/2006 | Dutton |

OTHER PUBLICATIONS

Beale et al, "Visualizing Communication Timelines Containing Sparsely Distributed Clusters", published as Oct. 19, 2001, pp. 1-4, http://infovis.cs.vt.edu/papers/VisualizingTimelines-infovis2001.pdf.*
Plaisant et al, "Lifelines: Visualizing Personal Histories", published Apr. 1996, pp. 1-7, http://delivery.acm.org/10.1145/240000/238493/p221-plaisant.pdf?key1=238493&key2=2614128021&coll=GUIDE&dl=GUIDE&CFID=63821717&CFTOKEN=48402026.*
Ron Baecker et al.; "Reducing the Gap Between What Users Know and What They Need to Know", Published in ACM's Conference on Universal Usability, 2000 Washington, DC, Nov. 16-17, pp.1-8.

* cited by examiner

*Primary Examiner*—Stephen Hong
*Assistant Examiner*—David Faber
(74) *Attorney, Agent, or Firm*—Cantor Colburn LLP; Daniel McLoughlin

(57) ABSTRACT

A user interface (UI), which reflects exchanges in the past and the future between a user and entities. The UI includes a background having a user defined granularity, a plurality of dots, which can represent at least one collaborative exchange of a user and which are each arranged on the background, a graphic connection between any two or more dots which each represent exchanges between the user and similar entities, a first graphic which includes first level information, and a second graphic which includes second level information. For any set of one or more dots which each represent exchanges between the user and similar entities, the dot closest to or within the central area includes a graphical identifier that indicates whether the entity is currently available for a new exchange.

5 Claims, 2 Drawing Sheets

TEMPORAL VISUALIZATIONS OF COLLABORATIVE EXCHANGES

BACKGROUND OF THE INVENTION

1. Field of the Invention

Figure 1:
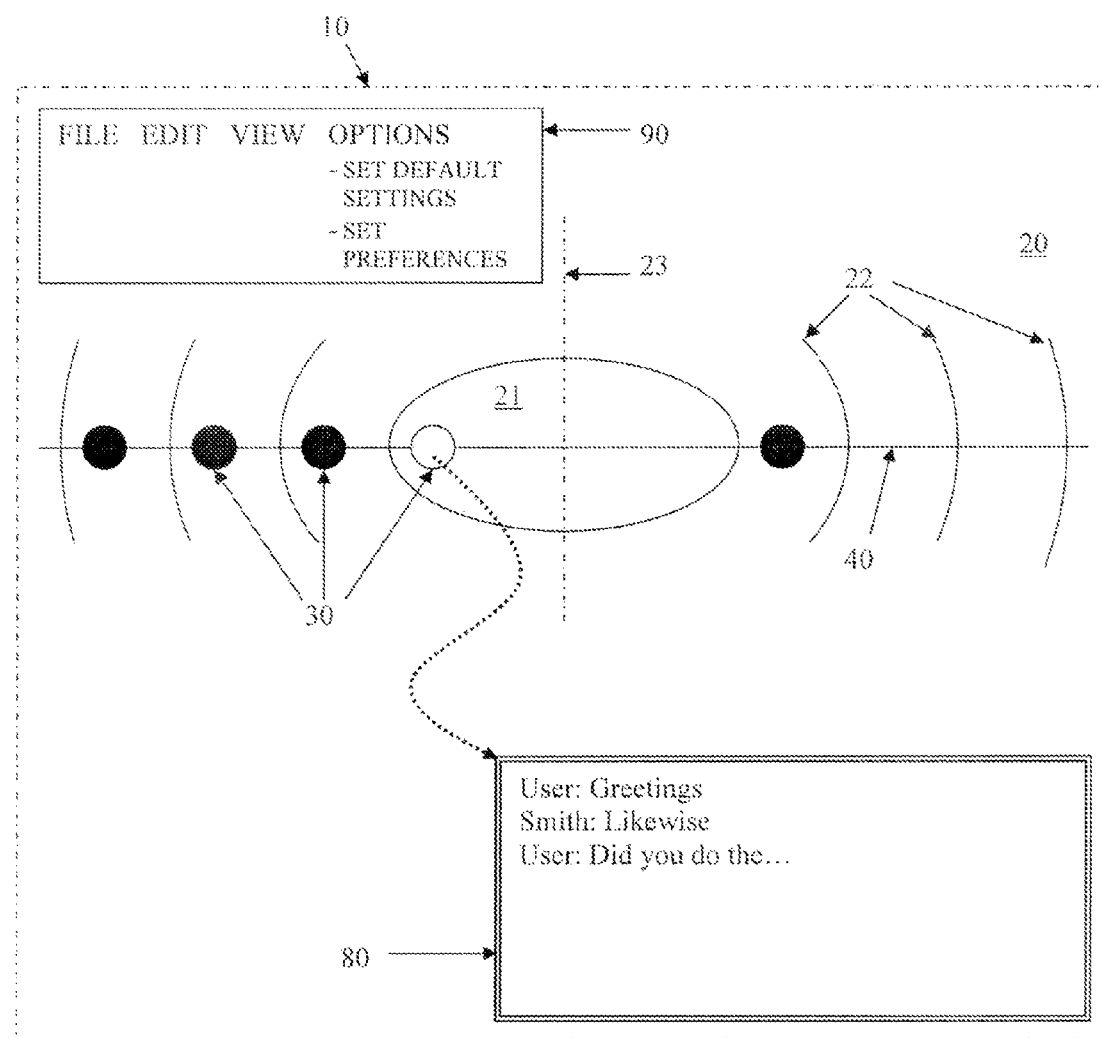

Aspects of the present invention relate to temporal visualizations of collaborative exchanges and, more particularly, to a user interface (UI) which supports temporal visualizations of collaborative exchanges.

2. Description of the Background

A common and increasing problem in many businesses is the ability to organize many collaborative input streams from many collaborative applications, to organize the number of people and processes that make use of them, and to allow individuals to recollect and/or return to an earlier collaborative exchange. Currently, individuals are required to remember some aspects of the collaborative exchanges to narrow down the approximate timeframe in which the collaborative exchange occurred.

However, when key information of a collaborative exchange, such as another entity's name, is not remembered by users of current collaborative applications, the applications do not aid or support the user in locating the corresponding collaborative exchange. Additionally, there is a continually growing volume of important information exchanged through different collaborative applications with users approaching their work from various "big picture" viewpoints. Moreover, the users may regularly deal with many workgroup teams, different geographics, different social networks and different timezones, etc.

SUMMARY OF THE INVENTION

In accordance with an embodiment of the invention, a real-time updateable user interface (UI), which reflects collaborative exchanges of the user, is provided. The UI includes a temporal display background having a user defined granularity including a central area which represents a present time, and markings which are arranged in steadily increasing radial distances from the central area and which correspondingly represent times of steadily increasing temporal distances from the present time, a relationship between the radial distances and the temporal distances being based on the user defines granularity, a plurality of dots, which each represent a collaborative exchange between the user and an entity and which are each arranged on the temporal display background at respective radial locations which correspond to a time the collaborative exchange occurred, a graphic connection between any two or more dots which each represent collaborative exchanges between the user and a similar entity, a first graphic which is enabled by a first interaction of the user with any one of the plurality of dots and which includes first level information relating to the entity, and a second graphic which is enabled by a second interaction of the user within the first graphic and which includes second level information relating to details of the collaborative exchange. For any set of one or more dots which each represent collaborative exchanges between the user and a similar entity, the one dot closest to or within the central area includes a graphical identifier that indicates whether the entity is currently available for a new collaborative exchange, and a third interaction of the user with the one dot initiates an Internet Messaging (IM) session between the user and the entity.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

Figure 2:
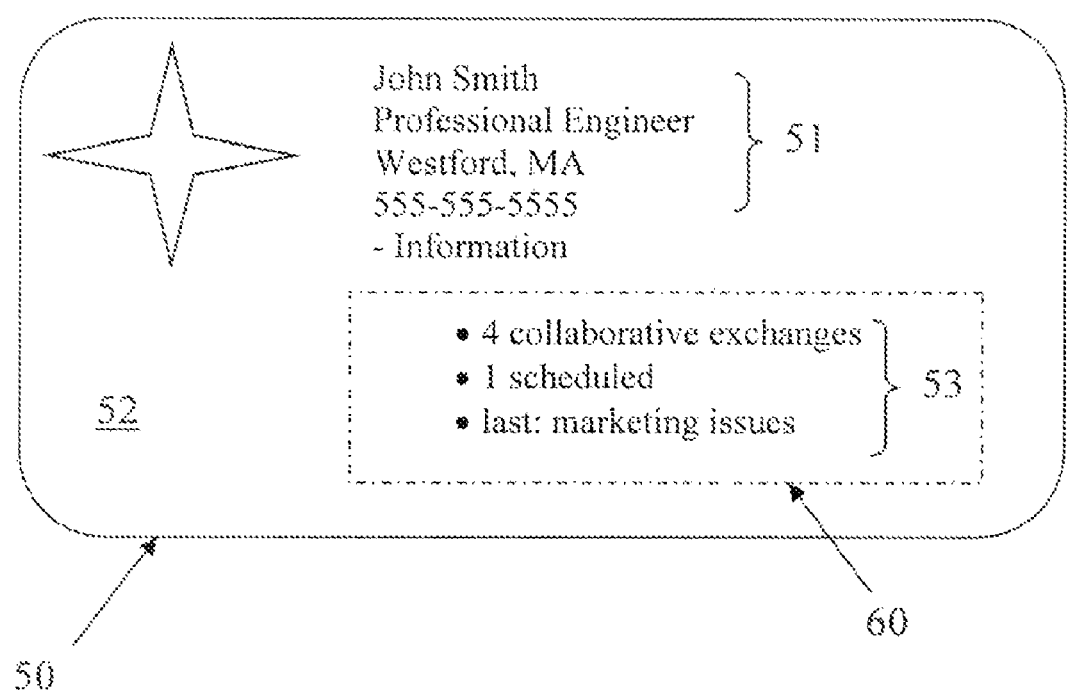

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a real-time updateable user interface (UI) according to an exemplary embodiment of the invention; and FIG. 2 shows first and second graphics according to an exemplary embodiment of the invention.

DETAILED DESCRIPTION OF THE INVENTION

With reference to FIG. 1, in accordance with an exemplary embodiment of the invention, a real-time updateable user interface (UI) 10 reflects collaborative exchanges between a user of the UI and other entities. Here, the user can be a person or a larger group within an organization. Similarly, the entities may be single individuals or groups of individuals. Further, the collaborative exchanges may include electronic communications between one or more people which use and/or are facilitated by email, IM, web-conferencing, blogs, wikis, social bookmarking, shared document libraries, team spaces, team activities, etc.

The UI 10 comprises a temporal display background (TDB) 20 having a user defined granularity. The TDB 20 includes a central area 21, which represents a present time, and markings 22 arranged around the central area. In an embodiment of the invention, the markings 20 may comprise parts of concentric circles having steadily increasing radial distances from the central area. Here, the radial distances correspond to times of steadily increasing temporal distance from the present time in accordance with the user defined granularity. Of course, it is understood that other similar graphics are possible.

In accordance with additional embodiments of the invention, the TDB 20 may be adjustable so as to focus on or hide certain periods of time in order to reduce a relative busyness of the TDB 20. Further, the TDB 20 may be divided into portions representing certain periods of time. For example, the TDB could be divided along a virtual line 23, which extends through the central area 21, into a first portion, which represents past times, and a second portion, which represents future times. In another embodiment, the division could be adjustable in real time so as to further control the relative busyness of the TDB 20. That is, if the user has many more past collaborative exchanges than scheduled future collaborative exchanges, the division between the past time and the future times could be adjustably displayed such that the future is represented by a relatively small portion of the TDB 20 and the past is represented by a relatively large portion of the TDB 20.

Pluralities of dots 30, or, where appropriate, individual dots 30 are displayed on the TDB 20. Each dot 30 represents at least one collaborative exchange between the user and at least one of the entities. Further, each dot 30 is arranged on the TDB 20 at respective radial locations, which correspond to a time the collaborative exchange occurred, and at respective circumferential locations, which correspond to a subject of the collaborative exchange.

In accordance with an embodiment of the invention, those dots 30, which represent collaborative exchanges based on similar subject matter between the user and various entities, may also be grouped together at respective circumferential locations in accordance with the subject matter of the corresponding collaborative exchange. That is, if it assumed that the user is engaged in a specified process within a larger business context, then all of the dots 30, which represent the user's collaborative exchanges related to that specified process, are displayed in similar circumferential locations of the TDB 20 around the central area 21.

Moreover, where the specified process is limited to a particular period, the dots 30 are corresponding located in similar radial locations with respect to their respective distance from the central area 21. Here, it is understood that, to the extent that the grouping of certain dots 30 together may result in conflicts as to the presentation of information in the UI 10, default settings and/or user defined preferences, which prioritize the presentation of such information, can be applied to alleviate the conflicts.

Furthermore, as an additional way to reduce the relative busyness of the TDB 20, in an embodiment of the invention, dots 30 that are grouped together may actually be combined as one dot 30. Here, the one dot 30 may be expanded as desired by the user in order to display constituent dots 30 and/or information about the corresponding collaborative exchanges represented by the constituent dots 30.

A graphic connection 40 is displayed between any two or more dots 30 which each represent collaborative exchanges between the user and the same or similar entities. In accordance with an embodiment of the invention, the graphic connection 40 may comprise a line extending from one dot 30 to another and, where a continuing relationship exists between the user and an entity with multiple collaborative exchanges, the graphic connection 40 extends through each of the dots 30 which represent those collaborative exchanges.

Here, according to embodiments of the invention, the graphical connection 40 comprises a straight line and/or a uniquely colored line to thereby present a clear picture of the continuing relationship and to differentiate the continuing relationship from relationships. Also, where the straightness or the color of the graphical connection 40 results in conflicts as to the presentation of information in the UI 10, the default settings and/or the user defined preferences can be applied to alleviate the conflicts.

With reference to FIG. 2, during a use of the UI 10, when the user employs, e.g., a mouse, and right-clicks on any of the dots 30, a first graphic 50 is enabled and displayed. The first graphic 50 includes first level information 51 relating to the entity with which the user held the corresponding collaborative exchange. In an embodiment of the invention, the first graphic comprises a virtual business card 52 of the entity, which provides, for example, the entity's name, a picture, and some key collaboration details. A second graphic 60, which includes second level information 53 relating to, at least, the corresponding collaborative exchange, is then enabled by a left-click of, e.g., a hyper text markup language (HTML) link within the first graphic 50. In an embodiment of the invention, the second graphic 60 provides additional details relating to specific details of the corresponding collaborative exchange. In an embodiment of the invention, the second graphic may also support search capabilities on at least content of those details.

With reference to FIG. 1, for any set of one or more dots 30 representing collaborative exchanges between the user and a particular one of the entities, the one dot 30 that is closest to or within the central area 21 includes a graphical identifier 70 that indicates whether the corresponding entity is currently available for a new collaborative exchange. In an embodiment of the invention, this graphical identifier 70 is a modification of a color of the dot 30 relative to other dots 30. A left-click on such a dot 30 could then initiate an Internet Messaging (IM) chat session 80 with the corresponding entity.

According to a further embodiment of the invention, the UI 10 may comprise a toolbar 90 with pull-down menus including an option button that leads to a menu in which the user is able to activate the default settings or to set the user preferences. Here, the user may further identify various display options, such as only displaying certain time periods, only displaying dots 30 representing certain types of collaborative exchanges, etc. Also, the user may temporarily remove at least one dot or at least one graphic connection corresponding to collaborative exchanges with at least one particular entity, and may filter a display of the UI according to collaborative exchange frequencies.

It is well known in the art that user interfaces are rendered on display devices through the use of machine- or computer-readable code stored on a memory.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A memory storing code for rendering a real-time updateable user interface (UI) which reflects collaborative exchanges of the user on a display device, said code comprising code segments for causing render of:
   a temporal display background having a user defined granularity including a central area which represents a present time, and markings which are arranged in steadily increasing radial distances from the central area and which correspondingly represent times of steadily increasing temporal distances from the present time, a relationship between the radial distances and the temporal distances being based on the user defined granularity;
   a plurality of dots, which each represent a collaborative exchange between the user and an entity and which are each arranged on the temporal display background at respective radial locations which correspond to a time the collaborative exchange occurred;
   a graphic connection between any two or more dots which each represent collaborative exchanges between the user and a similar entity;
   a first graphic which is enabled by a first interaction of the user with any one of the plurality of dots and which includes first level information relating to the entity; and
   a second graphic which is enabled by a second interaction of the user within the first graphic and which includes second level information relating to details of the collaborative exchange, wherein:
   for any set of one or more dots which each represent collaborative exchanges between the user and a similar entity, the one dot closest to or within the central area includes a graphical identifier that indicates whether the entity is currently available for a new collaborative exchange, and a third interaction of the user with the one dot initiates an Internet Messaging (IM) session between the user and the entity.

2. The UI according to claim 1, wherein the temporal display background is divided along a center line thereof into a first half which represents past times and a second half which represents future times.

3. The UI according to claim 1, wherein the dots representing collaborative exchanges which relate to similar subject matter are grouped together.

4. The UI according to claim 1, wherein:

the graphic connection comprises a line, the first graphic comprises:

a virtual business card of the entity; and details of the collaborative exchange, the second graphic comprises a navigable collaborative exchange history with the entity, and the graphical identifier comprises a modification of a color of the dot closest to or within the central area.

5. The UI according to claim 4, further comprising a tool to allow the user to:

define user preferences that alter the user defined granularity, an appearance and/or a performance of the UI, to temporarily remove at least one dot or at least one graphic connection corresponding to collaborative exchanges at least one particular entity, and to filter a display of the UI according to collaborative exchange frequency.

\* \* \* \* \*